June 18, 1963 A. C. DERVIEUX 3,094,590

REMOTELY CONTROLLED SOUND TRANSLATION APPARATUS

Filed Dec. 5, 1958 3 Sheets-Sheet 1

REMOTELY CONTROLLED SOUND TRANSLATION APPARATUS

Filed Dec. 5, 1958

3,094,590
Patented June 18, 1963

3,094,590

REMOTELY CONTROLLED SOUND TRANSLATION APPARATUS

Andre C. Dervieux, West Hartford, Conn., assignor to The Gray Manufacturing Company, a corporation of Connecticut Filed Dec. 5, 1958, Ser. No. 778,452
6 Claims. (Cl. 179—100.4)

This invention has to do with sound recording and reproducing apparatus, and in particular with message or dictation recording and playback apparatus of the type which can be remotely controlled by one or more users to afford both recording and review functions, as well as auxiliary functions such as the marking of correction, end-of-message, end-of-dictation and like indications upon a record strip for the guidance of a transcribing operator.

More particularly, the invention aims to solve certain problems in the design and operation of apparatus of the type described, and to accomplish the improvements without undesirably complicating the equipment or adding addition conductors to the cabling which connects the remote control or user's station with the central recording installation.

Remotely controllable recording and playback apparatus of various forms has been proposed by previous workers in the art. All such schemes as heretofore proposed have had serious drawbacks, either from the viewpoint of the user with complex operation to be performed, or from the viewpoint of the equipment complication involved, and their failure to provide adequate and precise control of the recording and playback functions. For example, it is highly desirable for the user to be able to control the central recording and playback equipment so as to obtain a review, or playback, of all or any selected part of the material which he has been dictating or recording. It is also very desirable that, when the desired portion has been so reviewed, the user may be able to continue promptly with further dictation, which should be recorded on the record medium in a position exactly following his previous material, without danger either of overlap or of blank or unrecorded medium between the two sections of the recording. In the usual case in which the recording is being made upon a record medium of a certain limited capacity, it is also desirable that the user be advised, by a suitable signal, when the capacity of the recording medium is nearly or completely exhausted. An anciliary and related requirement is that, following the completion of a recording period by one user, a second user shall not be permitted to initiate a recording session upon a record which is already so nearly exhausted that a recording of usual duration could not be completed thereon, but should instead be connected to another recorder at the central installation. While the satisfactory accomplishment of this latter aim would obviate the annoyance of a recording period interrupted prematurely because of record exhaustion, it would ordinarily involve a considerable wastage of the record medium, especially where the end portion of a record might in fact suffice for the recording of one or several short messages by the original user if he were properly advised of the fact that the expiration of the record capacity was approaching, though not yet reached.

The above considerations, and similar ones which will appear as the description proceeds, are satisfied by the present invention in a novel and efficient manner, and without the various complications and drawbacks which have characterized previous efforts to devise a fully satisfactory arrangement for the remote control of sound recording and playback apparatus. In part, the advantages realized by the present invention are due to the adaptation and modification of know components of sound recording equipment to provide improved and simplified construction and performance, but in part they are also attributable to fundamental changes in the underlying logic or operational sequence provided by the control circuitry utilized. For the purpose of providing a clear understanding of the principles of the invention, and to comply with the patent statutes, a preferred embodiment will be described herein by way of example, but it is to be understood that the invention itself can be carried out by specifically different forms of equipment and record medium.

By way of summary, the invention provides a remotely controlled sound recorder and reproducer capable of accepting record media, such as disc records, of several different capacities or sizes, together with elements operably controlled by the extent of exhauston of any record employed, for advising the user of the approach of, and of the arrival at, the point of complete record exhaustion, by different signals which are conveyed to the user as required, over the existing remote control channel or cable, without the need for additional conductors therein. These same elements are also employed, by the use of novel circuitry, for signalling to an attendant that a change in the record medium is required, and for preventing a later user from seizing the recorder until the medium has in fact been changed. In addition, the invention provides a high-precision marking or memory system for registering the position of the travelling recorder-reproducer carriage at the instant when the user has initiated a review or playback function following a recording period, and for wholly automatically restoring the carriage to that registered position when the user desires to resume the recording function. The same elements are moreover employed, if the user should elect not to resume recording after hearing a playback of a portion of his material, but instead disconnects his control station from the central recorder, to accomplish the fully automatic return of the carriage to a point at which the machine will be in readiness for providing recording service to a subsequent user who may seize the instrument. High speed forward and backward spacing of the traveling carriage are both provided by the invention, and since the "correction" signal is never required to be made during a review or playback operation, the line or channel which normally conveys the correction signal is automatically devoted, without attention by the user, to accomplishment of the high speed forward-spacing function; thereby accomplishing a substantial saving in complexity of the equipment and its control cables. The invention also provides an automatic signal to the user at the time that the carriage is restored to its proper position for a continuation of recording following a playback, either partial or complete, of previously recorded material, but it fully automatically reconditions the equipment for a resumption of the recording function when this position is reached, without further attention by the user. In aid of this function, and since the user may be employing the relatively high-speed forward spacing of the carriage and may thus overshoot the signal, means are provided for delaying the automatic restoration of the "correction" function slightly to prevent an inadvertent correction marking at such times. Finally, when the user has been advised by a signal that his machine is approaching the end of the available record medium, the invention provides him the option of continuing his main recording to the very end of the available medium, or of interrupting or terminating such material and utilizing the time remaining for one or more relatively short messages, each followed by the usual "end-of-message" marking for the later guidance of the transcribing operator.

When, however, the user does complete his recording session and initiates the "end-of-dictation" marking, the apparatus is automatically conditioned so that another user cannot begin its use with the undersirably short remnant of recording time which remains unused, and the attendant is signalled to replace the record with a fresh one.

The above and other objects, advantages and novel features of the invention will best be understood by referring now to the following detailed specification of the preferred form of the invention, taken in connection with the appended drawings, in which.

Figure 1:
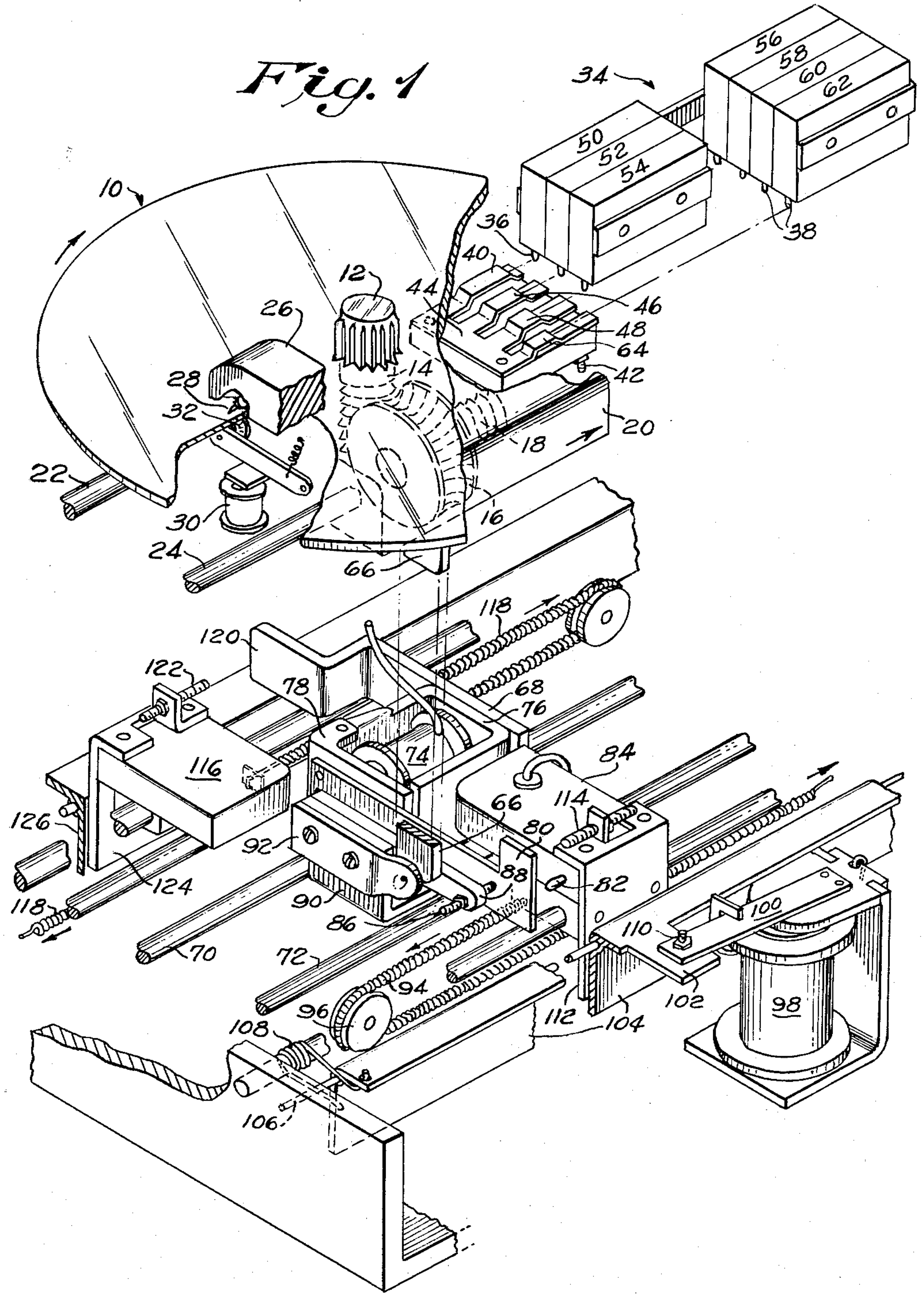
FIGURE 1 is a view in perspective, partly broken away and partly in exploded form, of the essential features of the central recording-reproducing apparatus of the invention.

The invention will be described as applied to a form of sound recorder and reproducer which is well known and whose basic arrangement is described in various prior patents; for example, in the patent to Foster, No. 2,738,194, issued March 13, 1956, to the assignee of the present invention. To avoid complicating the present description, only those features which are essential to the invention are shown in FIGURE 1. The sound recorder to which the invention is applied is of the constant linear speed type, and employs a rotating plastic record disc as indicated at reference numeral 10, rotated by a friction wheel or drive puck which is turned at constant speed by a suitable motor, not shown. The motor runs whenever the power switch is turned "on," and control of disc rotation is by means of a "start" magnet which forces an idler wheel against one surface of the disc and thus forces the other surface of the disc into driving relation with the friction wheel or drive.

The disc 10 mainly rests upon plush strips or the like upon an upper surface of the recorder cabinet as shown in the Foster patent, and is secured to a spindle 12 for rotation of the latter as the disc turns. The disc may thus have a serrated central opening which engages a fluted portion of the spindle. The spindle incorporates a drive worm 14 on its lower portion, mating with a worm wheel 16 in turn driving a horizontal lead screw 18 whose consequent rotation, as spindle 12 is rotated with the record disc, produces slow lateral translation of the carriage 20 which carries the spindle, and hence of the disc 10. The carriage 20 is guided for this lateral translation as by conventional guide rods 22 and 24. For clarity, FIGURE 1 is exploded vertically, and in fact is oriented from a viewpoint above and rearward of the equipment as normally installed.

The recorder head 26 is relatively fixed with respect to the machine framework, so that the combined rotation and slow lateral translation of disc 10, under head 26, defines a spiral recording path which, in the particular machine being described, appears as an embossed constant speed groove when the recorder stylus 28 engages the record surface. Provision is made for separating the record stylus from the disc during backspace and playback functions, shown in FIGURE 1 as a "compensator" magnet 30 operable to lower a support roller 32 which otherwise urges the record surface upward into embossing contact with the recorder stylus. The compensator allows for variations in record thickness, temperature characteristics and the like, as described in U.S. Patent 2,740,633 of April 3, 1956, to Moore and Roberts, and owned by the assignee of this invention. The reproducer stylus, not shown in FIGURE 1, may rest on the record surface at all times, at a point closely trailing the recording stylus 28.

The direction of motion of the carriage 20 during recording is, as indicated by the arrow thereon in FIGURE 1, to the right. During the latter part of the carriage travel, circuits are established to provide the desired signals to the user, or to an attendant operator, as mentioned above. More particularly, in a multiple-access remote control installation of the type in which any one of a plurality of users may seize the centrally located recorder, or one recorder from a group of such instruments, the use of such signals can contribute in an important way to efficient use of the recording material.

Thus, for example, it is desirable to eliminate the possibility that a user may seize a machine when only a short period of time remains available on the recording medium of that machine. According to the invention, this possibility is prevented by maintaining the machine in an "apparent busy" condition when the previous recording has ended at a point leaving only a small amount of unused space on the record. However, and while it is desirable to prevent a new user from seizing a machine with an inadequate amount of record capacity remaining the original user, properly advised as to the situation, might well use the entire remaining capacity, either for a continuation of a lengthy record, or for recording one or more short messages. Accordingly, the machine of the invention is arranged to provide the user who is approaching the end of the record with a tone signal which will advise him of this condition, and at a later point, will provide a more imperative signal indicating the imminent exhaustion of the remaining record capacity, and this function is also employed to indicate to an attendant, in installations of the attended type, that the record must be replaced.

There is thus required some means for operating signalling and control circuits at a variety of different positions of carriage travel in the "end zone" of the record disc. Moreover, efficient operation under different conditions calls for the establishment of the control points at different positions of the carriage, related to the various different sizes of discs which are conventionally employed in such equipment. Prior arrangements of this type employed a single set of carriage-operated switches, with means for shifting their position as a group when the record size was changed. Such arrangements are not well adapted to recorder equipment of the constant groove speed type, and especially where there may be a very substantial variation in record size.

Thus, for example, assuming three sizes of discs providing 15, 20 or 30 minutes of continuous recording with a standard 260 grooves per inch embossed at a constant linear velocity, the last three minutes of recording near the outside diameter represents a forward motion of the carriage as follows:

0.248" with the 15 minute disc
0.210" with the 20 minute disc
0.165" with the 30 minute disc A practical compromise can be made for the 15 and 20 minute discs, using an average carriage motion of 0.229 inch for the last three minutes of recording. A similar compromise between the motions of 0.229" and 0.165" no longer meets practical requirements. According to the invention, two separate sets of end-zone switches are employed, positioned in fixed locations, and the selection of one set or the other is readily accomplished by a simple selector switch marked in accordance with the capacity of the record being used. This avoids the complex mechanical linkages and interlocks previously required.

It is desirable, in such installations, to provide unattended service when required, as during night periods. The largest size of record is always used under these conditions, and all audible signals at the central station are eliminated. When the machine has been released after its capacity is nearly exhausted, the invention provides for maintaining the machine in "apparent busy"

condition to prevent its seizure by another, but at the same time continues the carriage motion to a point at which an additional end switch completely de-energizes the recorder motor and auxiliaries except for a night signal light. This carriage travel is achieved, according to the invention, without the formation of empty or unmodulated grooves in the record surface which would otherwise require the idling of a transcribing operator.

In the usual system of the type with which the invention is concerned, the remote control station ordinarily includes a telephone handset providing a microphone and a receiver for listening to portions of the record which are to be played back, together with a push-to-talk button which places the recorder in condition to record material dictated into the microphone. The usual handset cradle switch is employed to control seizure of an available recorder at the central location, and to release it upon conclusion of the dictation. Pushbutton type switches are also provided to actuate solenoid magnets for the making of "end" and "correction" punch marks on a record strip associated with the recorder, and to actuate circuits for shifting the machine from its recording condition to a playback or "listen" condition. The latter control will automatically backspace the record a certain distance, and according to the present invention it may be repeatedly operated to backspace any desired amount. In a multiple-access system, it is desirable to ensure privacy by preventing a second user of the equipment from listening to material which has been dictated by a first user, and this is provided by an ancillary feature of the invention.

Since the user may not wish to play back the remainder of his message after hearing some early part thereof, the invention also provides for a high speed forward spacing of the carriage when desired, limited to the exact point at which the previous recording terminated on the record. At the same time, if the user does in fact listen to his complete recorded message, the carriage will nevertheless stop in the precise position at which recording of new material should be resumed. Moreover, the invention provides an arrangement such that, if the user has played back a portion only of his recording, and then hangs up his handset to discontinue use of the machine, the latter will automatically traverse the carriage to the correct point at which a new user may seize the machine; during this travel, the machine will be maintained in an "apparent busy" condition to prevent its premature seizure by the subsequent user.

With the foregoing considerations in mind, the description of FIGURE 1 of the drawings may be continued. For simple design and easy servicing, it is usually desirable for the cabinet containing the recorder-reproducer parts to be separable, and in FIGURE 1 the parts so far described, including the spindle, carriage, transducer head 26, compensator magnet 30 assembly and the like, are mounted on or in an upper frame section which may be raised or pivoted up from a lower frame section. The upper section will also mount the groups of carriage-controlled switches generally indicated at 34. Each of these has a downwardly directed operating element such as indicated at 36 and 38, for actuating and holding operation by a corresponding upstand-projection such as 40, of which four are shown in the drawing. The projections are preferably formed on adjustable tongues, and the vertical position of each projection can be nicely adjusted to cooperate with the switch operating elements as by a lock screw 42 threaded through the support block 44 on which all of the deflectable tongues are mounted. Block 44 is in turn secured to the carriage 20 for motion therewith.

It is apparent from FIGURE 1 that, as recording proceeds, the three projections 40, 46 and 48 will actuate, in turn, the three switches 50, 52 and 54 which form a first group corresponding, for example, to the use as described above of presetting a 15 or a 20 minute disc capacity. At a position of carriage 20 corresponding to the end zone of a larger disc, such as the 30 minute example, these same projections will sequentially operate the switches 56, 58 and 60 of the second group; the switches of the first group are of course electrically disconnected in this case, by the manual selector switch to be described. Exactly the same functions and operations are accomplished by the two sets of switches as so far described, except they are accomplished at different points of carriage travel. In addition, the second group of switches includes a fourth switch 62, operated at a still later carriage position by the projection 64; this switch will come into operation with the record of largest size, when the "night" or unattended position is called for by the selector switch, as will be described below.

In order to effectuate the carriage-position memorizing functions required by the invention, the lower frame portion also contains a group of elements and assemblies, shown in the lower part of FIGURE 1. Secured to the carriage 20 is a downwardly extending tongue 66, arranged to fit between parts to be described in the lower apparatus group, and thus to transmit the carriage position to such apparatus without requiring a solid connection. In this way, the two frame portions can be detached, or the upper portion can for example be hinged upwardly, for precise adjustment and maintenance without any difficulty.

In the lower apparatus group, a rigid frame 68 is mounted for translation back and forth along supports such as guide rods 70 and 72, in a path parallel to that of the carriage 20. This frame carries a traveling magnet 74 whose magnetic yoke 76 has pivoted thereon the armature 78 normally urged away from the magnet by a spring not shown. A switch-operating leaf 80 is rigidly secured to armature 78 and extends to one side of the frame 68 for operating engagement with the button 82 of a memory switch 84. The position of the leaf 80 when the magnet 74 is de-energized is precisely adjustable by the back stop screw 86 threaded in a laterally extending portion 88 carried by the forward portion 90 of frame 68. A plate 92, also secured to this portion 88, is spaced from portion 88 to define therewith a space into which can extend the downwardly-extending tongue 66 of the carriage, when the frame parts are placed in juxtaposition.

Frame 68 will thus partake exactly of the motions of carriage 20, and when the frame travels to the right, in the "record" direction of the carriage travel, leaf 80 will engage the operating button 82 of switch 84, will operate the said switch, and will thereafter, during continued motion, carry the switch 84 in the same direction against the tension of a long coil spring 94 attached to the switch mounting and passing about a pulley wheel 96 mounted in the cabinet. When the carriage travel is reversed, the switch 84 will follow it to the left, unless it is retained in its position of farthest advance by energization of the stationary memory magnet 98.

When magnet 98 is energized, its armature pivots down and urges the end of a leaf 100 carried by the armature into contact with a lug 102 extending laterally from a braking strip 104 pivoted in the machine cabinet or frame as on a rod 106, and spring urged counter-clockwise as by the spring 108. An adjusting screw 110 may be provided to regulate the force appleid to the braking strip, so that when the magnet is energized, the depending portion of the brake strip will engage a depending part 112 of the mounting of switch 84, holding it against movement by its return spring 94. Suitable guide rods, as partially shown, are provided for the memory switch 84, to allow it to travel parallel to the path of travel of the traveling magnet 74. The brake strip 104 is sufficiently long to include the total possible travel path of switch 84, and if desired a frictional facing material may be applied to one or both of the braking surfaces as described.

Switch 84 will thus serve to mark or memorize the position of farthest advance of the record carriage 20, at the instant before its motion is reversed under control of the user who desires to backspace the carriage and thereafter cause the reproduction of material which he has recorded. Since the purpose of memorizing or registering this position of farthest advance is to permit the fully automatic reconditioning of the equipment for a resumption of recording when the carriage has returned to that position, switch 84 must operate to position the carriage precisely in position so that the recorder stylus, when again engaged with the record surface, will lie exactly in the final groove produced during the previous recording operation.

A switch such as switch 84, whether of the over-center or any other snap action type, will have an operating characteristic such that its contacts will close, from the open condition, at a slightly different position of its operating button 82 from that at which the contacts would open from the closed condition. This difference in position is known as the "differential" of the switch, and its magnitude varies from switch to switch. For fine groove recording, as in the equipment being described, this differential can easily exceed, by a factor of several times, the groove spacing used. Thus, the differential travel may be of the order of from 0.016 to 0.020 inch, whereas the groove spacing itself may be 0.0038″ for 260 grooves per inch.

Traveling magnet 74 compensates for the existence of this differential, by altering the position of its frame 68, and hence of carriage 20, at which the switch 84 will be operated when the carriage returns to its previous position of farthest advance. During recording movements of the carriage 20, to the right in FIGURE 1, the magnet 74 will be energized, by circuitry to be described below, and the leaf 80 will drive switch 84 to the right against the restoring tension of spring 94. When the user calls for a playback function, a circuit will energize brake magnet 98 at the point of farthest advance of the carriage 20. A backspace step will automatically ensue, and when leaf 80 leaves switch button 82, the switch will be closed to prepare a circuit for the automatic resumption of recording at a future time. During retrograde movement of the carriage and the frame 68, the traveling magnet 74 will be de-energized, and when the machine is again conditioned to resume recording, the carriage and frame will return in the right-hand direction and the magnet 74 will remain de-energized. Thus, the switch 84 will be opened at a slightly later carriage position than would otherwise be the case; namely, an amount later exactly corresponding to the differential travel of button 82, in opening and closing of the switch contacts. The recording will thus recommence in the exact carriage position at which it was interrupted.

Matters are also so arranged that, if the user decides to terminate his recording after having heard only a part of it played back, he may merely hang up his handset, thus opening the station or cradle switch, and this action will cause the carriage to return to the position marked by switch 84 before the machine is made available to another user.

It should be mentioned that while the above description treats the switch 84 as though its button 82 received the full thrust of the motion of leaf 80 during recording movements, the thrust is in fact taken by an abutment screw 114 adjusted in a bracket formed on the supporting frame of the switch. This screw controlling the switch overtravel will be adjusted so that it is engaged by leaf 80 only after the switch mechanism has been operated.

A simple extension of the mechanism just described provides for ensuring privacy against the playback of material previously recorded by a different user, by the prevention of backspacing a distance greater than that corresponding to the recording so far made by the subsequent user. This function, which has been accomplished in various ways in previous machines, can readily be provided by a second memory switch 116, also traveling parallel to the motion of frame 68, and urged as by coil spring 118 in the direction towards an abutment 120 which may be an integral lateral extension of the frame 68. An adjustable abutment screw 122 takes the thrust after operation of the switch button (corresponding to 82 of switch 84 but not shown in FIGURE 1) at the time of engagement. A depending part 124 secured to switch 116 cooperates with a braking strip 126, which has a return spring and operating magnet just as in the case of the other memory switch.

It is arranged that the brake operating magnet of this second memory switch is de-energized momentarily at the time that a user signifies that he has reached the end of his dictation, and remains energized when the user actuates the "end-of-message" mark with the intention of proceeding with dictation of other messages. When the brake magnet is de-energized, the switch 116 will be allowed to move up to the then position of the abutment 120. Upon engagement with the abutment, the switch contacts will operate a circuit preventing effective backspacing of the carriage 20 by any subsequent user, to any point farther back on the record. The brake magnet need not be kept energized during non-use of the equipment, but since the carriage will be stationary during such periods, it is only necessary to arrange matters so that, when a new user seizes the recorder, the operated switch will prevent backspacing, and the brake magnet will be energized to hold the switch locked in the position at which the new user begins to control carriage advances. He may thus freely backspace to a limiting point registered by the locked switch position, but the backspace control will be rendered thereafter inoperative if the carriage is returned fully to the point registered by switch 116.

The satisfactory accomplishment of the privacy function just described does not involve high precision of location of the carriage, so that it is unnecessary to provide the exact switch-differential compensation as in the case of switch 84.

*Electrical Circuits*

Figure 2:
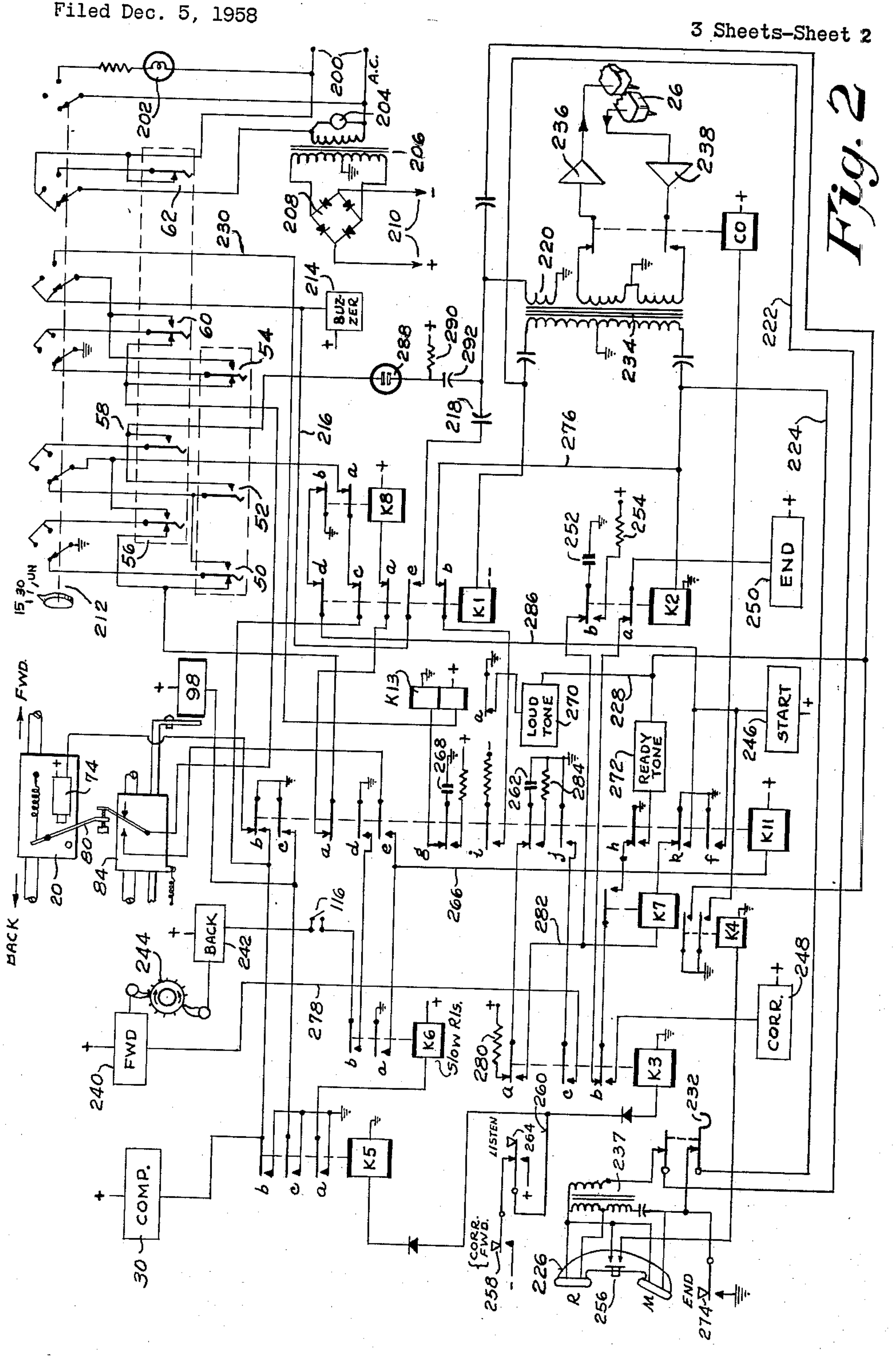
FIGURE 2 is a partial schematic wiring diagram of the equipment controls showing the circuitry related to the invention.

FIGURE 2 of the drawings is a schematic wiring diagram of the essential control wiring of the apparatus. A usual alternating current voltage supply is indicated at numeral 200, supplying directly the night light 202 under conditions to be described below. The same A.C. supply energizes the motor 204 driving the recorder-disc engaging drive wheel, except when interrupted as also described below. Finally, the A.C. source supplies the transformer 206 which supplies the rectifier 208 to provide at terminals 210 positive and negative D.C. voltages referred to ground, which may be the machine chassis or a common ground bus throughout the control system. Elements which have already been described in connection with FIGURE 1 are given the same reference numerals in the schematic.

*Selective (Record Size) Limit Switches*

The manual selector switch for selecting record sizes is indicated at numeral 212, and consists of six decks of three-position switches, as indicated. It will be noted that the first three decks, reading from the left, merely operate to transfer the external circuit control from switches 50, 52 and 54, for operation (for example) with 15 or 20 minute discs, to swtiches 56, 58 and 60 for operation with a 30 minute disc. The fourth deck connects a signal buzzer or the like 214 for operation, with the selector switch on "15" or "30" positions, when the last carriage position switch (54 or 60) is operated, to signal the attendant for changing the disc, and a portion of the buzzer signal voltage is coupled back, over lead 216 and contacts of relay K1, via capacitor 218, and signal transformer winding 220, to the audio line conductors 222, 224 leading to the remote user's handset 226.

The fifth deck of selector switch 212 establishes the motor and D.C. supply circuits directly when the selector is set for "15" or "30," but establishes them through the final carriage position switch 62 when the selector calls for unattended (UN) operation. The reason for this is that the buzzer would be useless where no attendant is present. Also, in this unattended condition, the feedback buzzer tone supplied the user is not furnished from the buzzer as above described, but a loud tone signal is applied to the user's handset over lead 228 from the "Loud Tone" generator indicated, due to operation of relay K13 over a conductor 230 from the third position contact of the fifth selector switch deck.

The sixth and last switch deck merely energizes the "Night" light 202 at the recorder equipment during unattended service, to signify that the equipment is conditioned for such unattended operation.

*Audio Line Circuits*

The handset arrangement may be of any conventional type, including the usual carbon button microphone and magnetic receiver. In any event, closure of the cradle switch 232 completes a direct current circuit from ground, through the coil of relay K2, line 224, the microphone, line 222, the coil of relay K1, and negative battery or D.C. supply terminal, to operate both these relays. Coupling capacitors couple any voice signals from the microphone into the primary winding of the line transformer 234, and thence through a secondary winding and over the changeover contacts of relay CO to the recorder amplifier 236. If relay CO is operated, its contacts couple the playback signals from reproducing amplifier 238 to transformer 234, and thence to the handset receiver through lines 222—224 and the station induction coil 237.

The arrangements of the traveling magnet 74, memory switch 84, memory switch brake magnet 98 and compensator magnet 30 have already been described. Numerals 240 and 242 designate conventional forward and backward spacing magnets for the carriage, operating for example upon pawls engaging a relatively high-speed carriage motion shaft as indicated at numeral 244. The "start" magnet which engages the disc-driving friction wheel into contact with disc 10, to turn the same, is indicated by numeral 246. Finally, magnets 248 and 250 respectively energize marking punches or the like to register "Correction" and "End of Message" designations on a paper strip associated with the recorder, as well known to those skilled in the art.

*Operation with a 15 Minute Record Seizure*

Seizure of an available recorder is accomplished by lifting the handset 226 from cradle switch 232, or equivalent action preparatory to use of the machine, which closes the audio line 222, 224 and relays K1 and K2 pull up, and guard relay K8, otherwise normally energized over K1(*a*), K11(*a*) and switch 50, drops out. The dropping out of guard relay K8 presents a "busy" condition to any other remote station attempting to seize the recorder, in any convenient manner of which the prior art affords many examples. The operation of relay K2 interrupts at its *a* contacts the circuit to the end solenoid 250, to prevent its energization even though relay K7 may thereafter be energized to close its contacts. The closure of contacts *b* of relay K2 causes the 30 mf. capacitor 252 to be charged up through the 47,000 ohm resistor 254. A "ready-to-dictate" tone signal generated by tone generator 272 is fed to the remote-station through winding 220 of the line transformer.

*Recording*

To record, the user operates the usual handset push-button 256 which operates relay K4 to close a circuit to "Start" magnet 246, forcing the motor-driven disc driving wheel into driving contact with the disc 10 and causing it to rotate. Another contact of relay K4 removes the "ready tone" signal from the line. The CO relay is normally in released condition, so recording amplifier 236 receives signals from the audio line 222, 224 and energizes the recording head 26. As the disc 10 rotates, and carriage

20 travels in the recording direction, energized traveling magnet 74 pushes switch 84 ahead, and this opens its contacts.

*Correction Marking*

To make a correction mark, button switch 258 is depressed momentarily, applying negative voltage to control line 260. Due to the presence of the diode rectifiers, only relay K3 operates, and its contacts *a*, which have been maintaining capacitor 262 in a charged condition through the resistor 280 as shown, discharge it over lead 282 through the coil of relay K7, which momentarily extends ground from K11(*k*) to contacts K3(*b*) and thence to the correction magnet 248 for pulsing actuation.

*Backspace and Listen*

If the user desires to listen to a playback of material which he has recorded, he operates button switch 264 momentarily, and due to the diode rectifiers as shown, relay K5 is operated, but relay K3 is not. Contacts K5(*a*) operate relay K6, and thereafter contacts K6(*a*) operate K11. When K5 releases, compensator magnet 30 (which was energized at contacts K5(*b*), now open) is kept energized at contacts K11(*b*); however, when K5 was operated, its contacts *c* energized the memory switch brake magnet 98, and this is held operated, even after K5 releases, by the contacts K11(*c*).

When K6 operated, its contacts *b* prepared a circuit for energizing backspace magnet 242 from contacts K11(*d*) as soon as the latter has operated, and this happens immediately because K11 is operated by K6(*a*) over conductor 266. Thus one backspace operation or step occurs at once, because relay K6 is made slow-to-release to ensure that it is still in operated condition when relay K11 pulls up, even through switch button 264 may have been released very quickly. K6 will now release, however, and the backspace magnet 242 will be de-energized. The backward motion of carriage 20 and the deenergization of the travel magnet 74, switch 84 being locked in position, allows switch 84 to close its contacts, and ground from end-zone contacts 54 is applied to conductor 266 via the now-closed contacts K11(*e*). Relay K11 is thus locked operated so long as carriage 20 remains spaced backward from the position registered by switch 84.

Additional backspacing, at the will of the operator, is obtained upon successive operations of button switch 264, because relay K11 being locked in operating condition, relay K5 can only energize K6 which through its contact *b* actuates the backspace mechanism 242 so long as switch 116 remains closed. The disc 10 is kept rotating by energization of "Start" magnet 246 at K11(*k*), so that the recorded material will be played back over the audio line when backspacing has been discontinued. Note that, since relay K11 is in operated condition, its contacts *f* have already operated to energize the CO relay and condition the amplifier 238 to reproduce the material over the audio line.

*Return From Backspace*

The normally-closed contacts at *b* of relay K11 have, of course, removed the ground from travelling magnet 74, which has dropped out. As already described in connection with FIGURE 1, this achieves compensation for the differential of switch 84, so that when all of the recorded material has been played back, bringing carriage 20 to precisely the position at which it lay when relay K11 operated (or such further position as the purposeful adjustment of the switch 84 may call for), switch 84 will open, and remove the ground from contacts *e* of K11 and conductor 266, allowing K11 to drop out.

*Auxiliary Functions of Relay K11*

Besides the operations as described above, which accomplish the fully automatic restoration of the complete instrument to its ready-to-record condition, without any conscious action by the user, following the playback of all or any selected part of recorded material, relay K11 per-forms certain important but auxiliary functions. These will be mentioned briefly, in aid of a complete understanding of the schematic diagram.

First, the closure of contacts K11(*g*) has charged up a capacitor 268 through an indicated resistor, so that when relay K11 becomes de-energized, relay K13 will be pulsed momentarily by the application of this positive voltage pulse to its upper winding, operating contacts *a* of K13 to cause a loud "beep" tone on the audio line from source 270, and thus to indicate to the user that the position for continuing recording has been reached. Contacts *a* of K11, of course, prevent guard relay K8 from being energized, even if the user should cradle his handset before K11 has released, which would release relay K1; the busy condition is thus maintained until K11 has released and the machine is ready to take dictation from another user. Also, during the time that relay K11 remains operated, its contacts *h* control the "Ready to Record" tone source 272 and prevent this quieter tone from being sent to the handset receiver. Finally, contacts K11(*k*) remove ground from the coil of relay K7 and prevent an improper actuation of the "End" magnet 250 during listening periods, but complete the circuit to Start magnet 246.

*"End" Marking*

An "End-of-Message" momentary pushbutton switch 274 is provided at the remote control station, depression of which at any time that listen relay K11 is not operated will ground the conductor 224, thus shorting the coil of relay K2 and causing it to drop out momentarily, and its contacts K2(*b*) connect the charged capacitor 252 to relay K7, to operate the latter also momentarily. The circuit is from grounded contact K11(*h*), the contacts of K7, contacts K3(*b*), and contacts *a* of K2, to end magnet 250.

If, however, the user has played back an early portion of his recording, and does not wish to continue with additional playback nor to use the machine further, he may wish merely to cradle his handset. As will be described below, the machine will be kept in an apparent "busy" condition while it restores itself to the last recorded point, and when it reaches that point, will also be reconditioned for recording after seizure by another user. Obviously, however, it is necesary, when this happens, that an "end-of-dictation" mark shall first be punched into the designation strip for use by the transcribing operator. This automatic "end" mark is obtained as follows.

*When Hanging Up During "Listen"*

When the user, as described in the foregoing paragraph, hangs up his handset prior to complete return of the carriage, the machine will continue to operate in its playback condition until switch 84 opens, releasing the holding circuit for relay K11. Since the handset has been cradled, switch 232 opens, and seizure relay K1 drops out, while seizure relay K2 remains energized over lead 276, K1(*b*), K11(*i*) and the negative D.C. terminal. Energized relay K2 thus holds the circuit of the "end" magnet 250 open until relay K11 drops out, whereupon relay K2 also drops out and capacitor 252 pulses relay K7 to produce the end marking just as described in connection with the operation of end pushbutton switch 274. Contacts K11(*a*) keep the guard relay de-energized to prevent seizure from another control station until the machine is fully returned to the condition for additional recording use.

*Forward Spacing*

It has already been described how the operation of button 258 operates, during recording periods with relay K11 released, to energize the correction magnet 248. Since the use of this function during playback and listening is meaningless, the identical control circuit from button 258 is utilized, during playback, to permit a fast forward-spacing action where the user desires to return more rapidly to the disc position at which he may resume dictation; for example, where he has played back only an early portion of his prior recording. During this playback period, relay K11 is operated as already described, and its contacts *h* are open, and prevent operations of relay K3 from making correction signals to the magnet 248. Instead, contacts *j* of relay K11 supply a ground connection over lead 278 and contacts *c* of relay K3 each time the latter operates, to pulse the "forward" spacing magnet 240.

However, where the user is accomplishing fast forward spacing by repeated operations of button switch 258 (rather than allowing the return to be accomplished by the more leisurely progress of the record disc 10), he may inadvertently operate the button 258 once or twice after hearing the loud "beep" tone which signifies that he has returned to the registered position. This over-shoot will not be effective to move carriage 20 too far, because relay K11 will drop out promptly as switch 84 opens, but by the same token the prompt drop-out of the relay would recondition the "Correction" circuitry and produce an improper correction signal on the transcriber's instruction strip. It will be recalled that the "Correction" signal was obtained by the pulsing of relay K7 by means of the charge on condenser 262 each time relay K3 pulled up, its contacts *a* shifting the condenser from the charging resistor 280 to the conductor 282 leading to relay K7 coil. To prevent the accidental correction signal during the period directly following release of relay K11, if the user should fail to stop pushing the correction (Forward Space) button promptly on occurrence of the "beep" signal, the condenser 262 is maintained in a discharged condition while relay K11 is operated. The low-valued resistor 284 (of the order of 50 ohms, for example) accomplishes this purpose. Thus, when relay K11 first drops out when the carriage returns to its registered position, operation of pushbutton 258 is rendered ineffective, for two or three seconds, to produce a correction marking. After that interval, corresponding to the time constant characteristic of the R(280)—C(262) circuit, correction marks will be made as called for, during subsequent recording operations.

*End Zone Signals*

Of the two sets of end zone switches shown in FIGURE 2, one set consisting of switches 50, 52 and 54 is employed with the smaller record, say of 15 minutes duration, and the switches are positioned so as to be operated respectively when 12, 14 and 15 minutes of the available recording time have been used. These positions can be varied, within limits, as desired. As better shown by the flat-top actuators 40, 46 and 48 in FIGURE 1, each switch will remain actuated until after completion of the record time; say until the 16 or 17 minute position of the carriage 20.

With a 15 minute record, the selector switch 212 will be placed in position "15," and when switch 50 is actuated, it opens a grounded path for the coil of relay K8, the path extending over contacts K11(*a*) and K1(*a*). It will be recalled that the seizure relay K1 is continuously energized when a station switch 232 is closed, and that guard relay K8 provides a busy condition when de-energized and an "available" condition when energized. The actuation of switch 50 also prepares a grounded path for the compensator magnet 30 through the selector switch first and second decks, K8(*a*), and K1(*c*), the latter relay still in operated condition and K1(*c*) open. As long as the recording continues uninterrupted, actuation of switch 50 does not alter the machine condition, but when the remote station disconnects, relay K1 releases and completes the grounded path to actuate the compensator magnet, which drops the disc surface from the recording stylus and energizes the "Start" magnet 246 through K8(*b*), K1(*d*) and lead 286. The guard relay K8, remaining de-energized, maintains the busy condition. The disc continues to rotate without groove formation, and no other remote station can seize the recorder with less than two or three minutes of time remaining on the disc.

During this time, the uninterrupted forward movement of the carriage actuates switch 52, which establishes a grounded path for an "alert" light 288, through the selector switch decks and switches 50 and 52. The alert light is part of a relaxation oscillator consisting of the lamp itself, a neon or similar gas tube type, the resistor 290, capacitor 292, and winding 220 of the audio transformer. The light flickers when energized, and this calls the attention of the attendant, who also notes that the disc is rotating without groove formation or modulated signals (where a modulation indicator lamp is provided), and hence changes the disc. If the change is not made, the continued carriage motion, holding switches 50 and 52 in actuated condition (see FIGURE 1), operates switch 54 which actuates the buzzer 214.

In connection with the foregoing, it is pointed out that the loss of a few seconds or minutes of availability for one machine out of an available pool has no appreciable affect on the overall dictation traffic system, and that if the user has not disconnected after actuation of switches 52 and 54, the impulses of the same relaxation oscillator as described, feed to the audio line via the transformer 234, advising the user that only a minute or so of time remains available. Continued dictation at this time is noted by the attendant who need take no action until the buzzer sounds. When it does so, the feedback path over conductor 216, K1(*e*) and capacitor 218 also conveys buzzer tone to the user.

Switches 56, 58 and 60 perform exactly the same functions when the selector switch is set on "30" for example, but they may be actuated at say 27, 29 and 30 minutes of recording.

When the selector switch 212 is set for unattended operation, the 30-minute switches 56, 58 and 60 will operate as before, but switch 60 no longer operates a buzzer. A high-level tone is provided from source 270 via contacts *a* of relay K13. Should remote station disconnection occur at any time after the operation of switch 56, the recorder remains in "apparent busy" condition, with the start magnet energized, without groove formation, until the carriage, at the 31 minute position, actuates the switch 62, which opens the power line 200, dropping out all relays and signalling a busy condition at all remote stations by de-energizing their "ready" lights. Only the night signal lamp 202 will remain energized.

It will be apparent from what has been said that when the user disconnects in the end zone, both relays K1 and K2 drop out, and relay K2 provides an "end of dictation" mark as already described, while the combined action of K1 and switch 50 (or 56) places the machine in "apparent busy" condition with the start magnet energized. However, an "end-of-message" mark, as usual, can be made in the end zone just as before, by operation of the manual pushbutton switch 274. In this case the machine does not become disabled and the dictator can use the total recording capacity of the medium.

Figure 3:
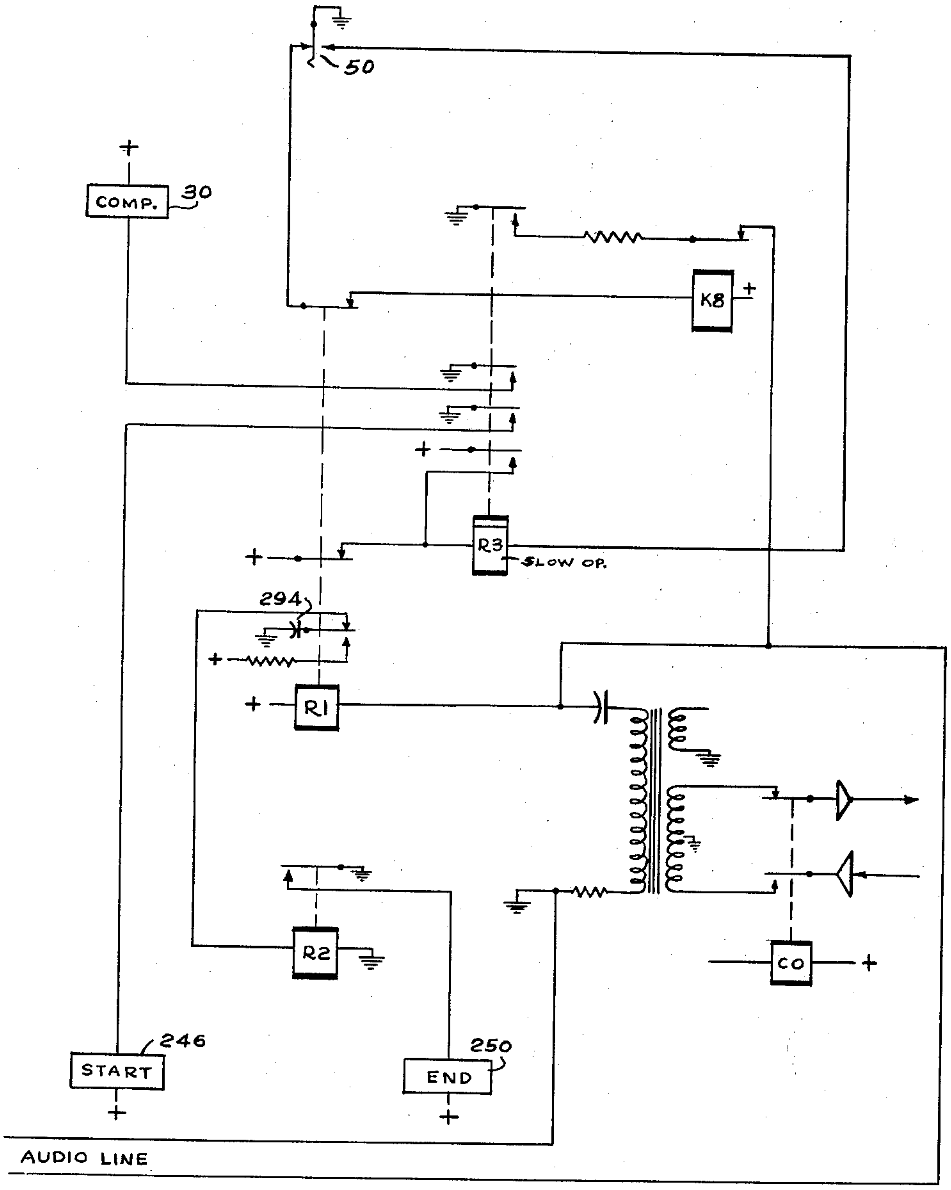
FIGURE 3 is a schematic wiring diagram similar to a portion of FIGURE 2, but showing a modified form of control circuitry.

*FIGURE 3 Modification*

FIGURE 3 of the drawings shows a variation of the end marking control circuit which permits, through a single station switch, the same differentation between "end-of-message" and "end-of-dictation" markings, as far as the conditioning of the machine is concerned, when the recording has reached the end zone of the medium. As indicated above, in FIGURE 2, switch 274 is used to mark an "end-of-message," and cradle switch 232 is normally operated in hanging up the handset to mark an "end-of-dictation." When the recording has reached a point where end zone switch 50 or 56 (depending upon the disc size) is actuated, the full control of the machine remains at the remote station when the user actuates the "end-of-message" switch. This control is lost in actuating the "end-of-dictation" cradle or station switch.

The circuitry shown in FIGURE 3 permits the same control of the machine in the same condition, when the remote station is only equipped with a cradle switch, without a separate "end" switch. The operation of seizure relay R1 is directly controlled by the closing or opening of the station switch, in a manner similar to seizure relay K1 of FIGURE 2.

When seizure relay R1 is released in FIGURE 3, as by opening of the cradle switch or audio line, charged capacitor 294 pulses relay R2 and operates the end magnet as before. In the end zone, however, with switch 50 (or 56) closed, a prolonged (one to three second) interruption of the audio line circuit also causes operation of the slow-to-operate relay R3, energizing the start magnet 246 and the compensator magnet 30 and generally providing the "apparent busy" condition with record rotation as above. If the user, however, has indicated the end of a message by merely briefly interrupting the audio line circuit, and immediately restoring it, relay R3 will not operate, and the end marking will be made without initation of the end-zone "apparent busy start" condition which would prevent further dictation by the same user. The guard relay K8, of course, will prevent seizure by another user at all times, except during the brief interval of the operating delay of relay R3, which exception is in practice of trivial significance.

Emphasis has been placed in the foregoing on the desirability of returning the carriage, completely automatically, to the exact point at which dictation was interrupted, but it is to be understood that this precision control can also be set to provide effective means of compensation for the trailing distance existing between the reproducer and recorder styli. The precision relocating control is fully as important where this is to be done, in order to provide complete playback operation to the last recorded word, to avoid overlap recording and, also, to avoid unnecessarily long or uncontrolled blank spaces on the record.

The invention has been described above in considerable detail, to enable those skilled in the art to practice the same, but various modifications of the apparatus used, and alternative ways of accomplishing equivalent results, can readily be visualized in the light of this disclosure, and it is intended to include herein all such as properly fall within the scope of the appended claims.

I claim:

1. In recorder-reproducer apparatus of the type having a carriage, driving means for moving the carriage at recording speed in one direction, high-speed carriage stepping backspace means, high-speed carriage stepping forward space means, "correction" registering means, and a control circuit normally connected to said "correction" registering means for the operation of the latter when said control circuit is energized by the user during recording operations; the combination of switching circuit means operated automatically by the carriage whenever the latter is backspaced from its last recording position, for disabling the "correction" registering means and connecting said control circuit to the forward space means.

2. Apparatus in accordance with claim 1, including time delay means operable automatically upon return of said carriage to its last recording position, for restoring the operable condition of said "correction" registering means after a brief interval following such return.

3. Apparatus in accordance with claim 1, including means responsive to the return of said carriage to its last recording position, for signalling this event to one using the apparatus.

4. Apparatus in accordance with claim 1 in which said switching circuit means also includes means for conditioning the apparatus for a reproducing function whenever the carriage is backspaced from its said last recording position, including electrically operable means for lowering the record medium at the contact point of the recorder stylus to provide a safe gap between both without alteration of the contact of the reproducer stylus with the record medium.

5. In a remote control sound recorder and reproducer apparatus including a central recorder-reproducer and at least one remote control station, said recorder-reproducer including a carriage progressively movable in a path in accordance with the degree of exhaustion of a record medium; a plurality of sets of position-sensing switches disposed adjacent said path and at different positions therealong for cooperation with said carriage at positions corresponding to various degrees of exhaustion of record media of differing sizes, a group of switch operators mounted on said carriage for cooperation with the respective switches of each set in turn during the full travel of said carriage, and manually operable selector switch means for selectively connecting the individual sets of switches to the operating circuits of said recorder-reproducer.

6. Apparatus in accordance with claim 5, in which said selector switch means includes an "unattended" position conditioning the set of switches corresponding to the largest record size for control of the operating circuits, and an ultimate limit switch selected in said "unattended" position and arranged to shut down the apparatus against further remote control, including means for cancelling audible alert signals at the central station and means of providing proper audio signals at the remote station.

References Cited in the file of this patent

UNITED STATES PATENTS

| | | |
|---|---|---|
| 2,235,301 | Robinson | Mar. 18, 1941 |
| 2,645,682 | Lynch | July 14, 1953 |
| 2,788,395 | Kobler | Apr. 4, 1957 |
| 2,803,707 | Taylor | Aug. 20, 1957 |
| 2,816,177 | Logan | Dec. 10, 1957 |
| 2,833,865 | Kutik | May 6, 1958 |
| 2,834,839 | Logan | May 13, 1958 |
| 2,844,664 | Kutik | July 22, 1958 |
| 2,881,264 | Kobler | Apr. 7, 1959 |
| 2,882,346 | Jones | Apr. 14, 1959 |